United States Patent
Zenno et al.

(10) Patent No.: US 7,527,579 B2
(45) Date of Patent: May 5, 2009

(54) STRADDLE-TYPE VEHICLE HAVING CLUTCH CONTROL DEVICE AND METHOD OF USING CLUTCH CONTROL DEVICE

(75) Inventors: Toru Zenno, Shizuoka-ken (JP); Atsushi Kamo, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 270 days.

(21) Appl. No.: 11/301,282

(22) Filed: Dec. 12, 2005

(65) Prior Publication Data

US 2006/0128527 A1   Jun. 15, 2006

(30) Foreign Application Priority Data

Dec. 10, 2004   (JP) .............................. 2004-359223

(51) Int. Cl.
*B60K 23/02*   (2006.01)
(52) U.S. Cl. ............................ 477/167; 477/73; 477/74; 477/172; 477/173
(58) Field of Classification Search ................... 477/70, 477/71, 73, 74, 83, 84, 166, 167, 172, 173, 477/174, 175
See application file for complete search history.

(56) References Cited

U.S. PATENT DOCUMENTS

| | | | |
|---|---|---|---|
| 4,497,222 A | 2/1985 | Nagaoka et al. | |
| 5,964,680 A * | 10/1999 | Salecker et al. | 477/74 |
| 6,257,081 B1 | 7/2001 | Gagnon et al. | |
| 6,524,224 B2 * | 2/2003 | Gagnon et al. | 477/175 |
| 6,564,663 B2 | 5/2003 | Rioux et al. | |
| 6,569,057 B2 * | 5/2003 | Jones et al. | 477/74 |
| 6,896,112 B2 * | 5/2005 | Berger et al. | 192/52.4 |
| 6,910,987 B2 * | 6/2005 | Richards | 475/283 |
| 6,931,839 B2 | 8/2005 | Foster | |
| 7,000,717 B2 * | 2/2006 | Ai et al. | 180/65.2 |

FOREIGN PATENT DOCUMENTS

| | | | |
|---|---|---|---|
| EP | 385629 A2 * | 9/1990 |
| EP | 742386 A2 * | 11/1996 |
| JP | 6-8903 | 3/1994 |

* cited by examiner

*Primary Examiner*—Ha D. Ho
(74) *Attorney, Agent, or Firm*—Knobbe, Martens, Olson & Bear, LLP (57) ABSTRACT

A clutch control device is used to engage and disengage a clutch of a straddle-type vehicle. A method of using the device comprises detecting a predetermined operation, such as positioning a key switch in an ON position, for starting use of the straddle-type vehicle, detecting application of a brake of the straddle-type vehicle, and actuating clutch control means that disconnects the clutch upon detection of application of the brake if the predetermined operation for starting use is detected.

24 Claims, 8 Drawing Sheets

STRADDLE-TYPE VEHICLE HAVING CLUTCH CONTROL DEVICE AND METHOD OF USING CLUTCH CONTROL DEVICE

RELATED APPLICATIONS

The present application claims the priority benefit of Japanese Patent Application No. 2004-359223, filed on Dec. 10, 2004, which is hereby incorporated by reference in its entirety.

The systems and methods described herein also can be used with other types of transmissions, clutch mechanisms and associated control systems and routines, such as those described in one or more of the following copending U.S. patent applications: (1) application Ser. No. 11/301,288, filed on even date herewith, which is entitled STRADDLE-TYPE VEHICLE HAVING CLUTCH ENGAGEMENT CONTROL DEVICE AND METHOD OF USING CLUTCH ENGAGEMENT CONTROL DEVICE; (2) application Ser. No. 11/301,646, filed on even date herewith, which is entitled CLUTCH ACTUATOR FOR STRADDLE-TYPE VEHICLE; (3) application Ser. No. 11/299,720, filed on even date herewith, which is entitled APPARATUS AND METHOD FOR CONTROLLING TRANSMISSION OF STRADDLE-TYPE VEHICLE; and (4) application Ser. No. 11/299,858, filed on even date herewith, which is entitled GEAR CHANGE CONTROL DEVICE AND METHOD. The contents of all of the above-noted copending U.S. patent applications are hereby incorporated by reference in their entireties.

BACKGROUND OF THE INVENTION

1. Field of the Invention

The present invention generally relates to a clutch control device, a method of using the clutch control device and a straddle-type vehicle that employs the clutch control device. More specifically, the present invention relates to a clutch control device that controls operation of the clutch when starting the straddle-type vehicle.

2. Description of the Related Art

Conventionally, there are known automatic transmissions of automobiles for electronic control of gear shift and engagement/disengagement of a clutch based upon a pattern preset according to an operating condition of a vehicle. Such automatic transmissions include ones in which, when the key switch is turned OFF, the engine speed is zero and the vehicle speed are zero, the clutch is engaged and then control is terminated (for example, see JP-UM-B-6-8903). With such a construction, the clutch is engaged when the engine and the vehicle are stopped. With the clutch engaged, it is possible to reduce the likelihood of undesired vehicle movement. Accordingly, when the vehicle is stopped on a slope, the vehicle will be more likely to remain stationary while the clutch is engaged.

In the four-wheel vehicle arts, the vehicles usually comprise a parking brake. When a parking brake is used, the vehicle is less likely to move even when a clutch is disengaged upon starting of the engine of the vehicle following the vehicle being stopped with the clutch engaged. However, most straddle-type vehicles, examples of which include motorcycles, are not equipped with parking brakes. Accordingly, measures are desired that can reduce the likelihood of inadvertent movement of the straddle-type vehicle when the clutch is disengaged for starting.

SUMMARY OF THE INVENTION

Thus, one aspect of the present invention involves a clutch control device of a straddle-type vehicle that is used to engage and disengage a clutch with a clutch actuator. The clutch control device comprises an operation detection means that detects a predetermined operation indicative of the vehicle being started. A brake application detection means is provided that detects application of a brake of the vehicle. Clutch control means is provided that disengages the clutch upon detection of brake application if the predetermined operation indicative of the vehicle being started is detected.

Another aspect of the present invention involves a clutch control method for engagement and disengagement of a clutch of a straddle-type vehicle by a clutch actuator. The clutch control method comprises detecting a predetermined operation for starting use of the straddle-type vehicle, detecting application of a brake of the straddle-type vehicle, and putting the clutch in a disengaged state upon detection of application of the brake if the predetermined operation for starting use is detected.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENT

Figure 1:
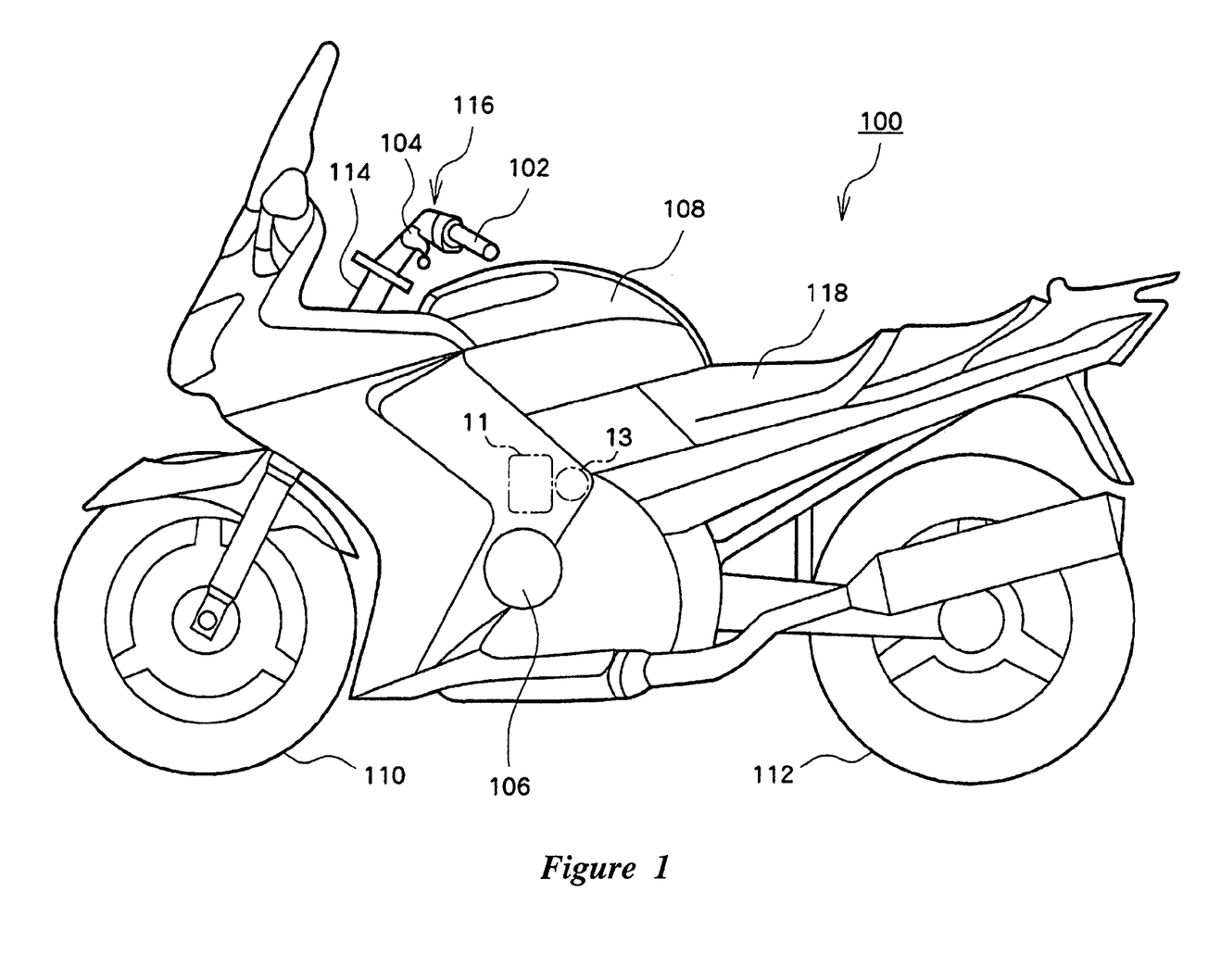
FIG. 1 is a side view of a straddle-type vehicle that is arranged and configured in accordance with certain features, aspects and advantages of the present invention.

With reference now to FIG. 1, a straddle-type vehicle is illustrated that has been arranged and configured in accordance with certain features, aspects and advantages of the present invention. In the illustrated configuration, the straddle-type vehicle is a motorcycle 100. In other configurations, the straddle-type vehicles can comprise, for example but without limitation, motorcycles, motorized bicycles, scooters, three-wheeled and four-wheeled buggies such as all terrain vehicles, snowmobiles and the like.

The illustrated motorcycle 100 comprises a front wheel 110 and a rear wheel 112. A front fork is connected to the front wheel 112. A handle 116 extends laterally across the motorcycle 100 and is connected to a top of the front fork 114. The handle 116 comprises a grip 102 and a clutch lever 104 that are mounted at a first end and an accelerator grip and a brake lever (not shown) that are mounted at a second end.

The motorcycle 100 comprises an engine 106 and a fuel tank 108 that is positioned generally vertically above the engine 106. The motorcycle further comprises a seat 118 that is provided on an upper portion of the motorcycle 100 at a location rearward of the fuel tank 108 in the illustrated configuration. A rider can ride the motorcycle 100 while straddling the seat 118.

The motorcycle 100 comprises a clutch actuator 11. A control device 120 (see FIG. 2) controls the clutch actuator 11. The engagement and disengagement of the clutch are performed by a drive force, such as that supplied by electric power rather than that provided by human power. The clutch actuator 11 preferably uses a motor to operate a clutch that is provided in a crankcase of the engine 106. In the preferred configuration, the motorcycle 100 comprises a single clutch and torque of the engine 106 is input into the transmission by the action of the single clutch. The clutch actuator 11 can be mounted above the engine 106. In a preferred configuration, the clutch actuator 11 is mounted in a region above the engine 106 and below the fuel tank 108. The clutch lever 104 can be connected to the clutch actuator 11 by a length of wire so that engagement and disengagement of the clutch also can be performed by operator of the vehicle by manipulating the clutch lever 104.

The motorcycle 100 also comprises a shift actuator 13. In one configuration, the shift actuator 13 comprises a motor that operates a transmission provided in a transmission casing of the engine 106. The shift actuator 13 can be controlled by the control device 120 and the shift actuator 13 causes shifting of the transmission.

Figure 2:
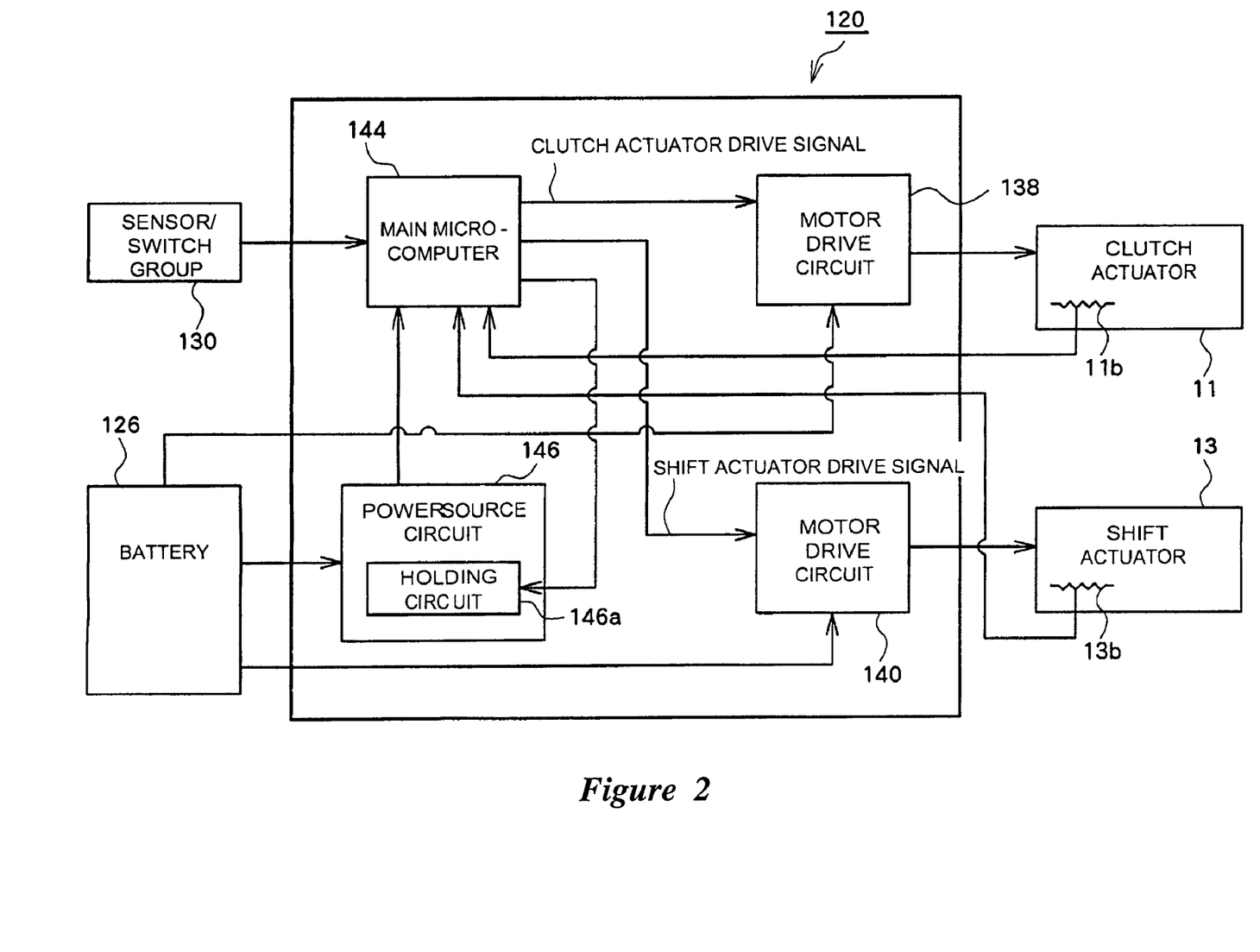
FIG. 2 is a schematic view showing a hardware configuration of a clutch and a transmission control system that can be used on the straddle-type vehicle of FIG. 1.

With reference now to FIG. 2, a sensor/switch group 130, the clutch actuator 11, and the shift actuator 13 are connected to the control device 120. A battery 126 also can be connected to the control device 120 such that electric power from the battery 126 is supplied to the control device 120. The electric power from the battery 126 also can be supplied to the clutch actuator 11 and the shift actuator 13 via the control device 120 or in any other suitable manner. Thus, the electric power of the battery 126 can be used to operate the control device 120 and can be used to operate the clutch actuator 11 and the shift actuator 13.

Figure 7:
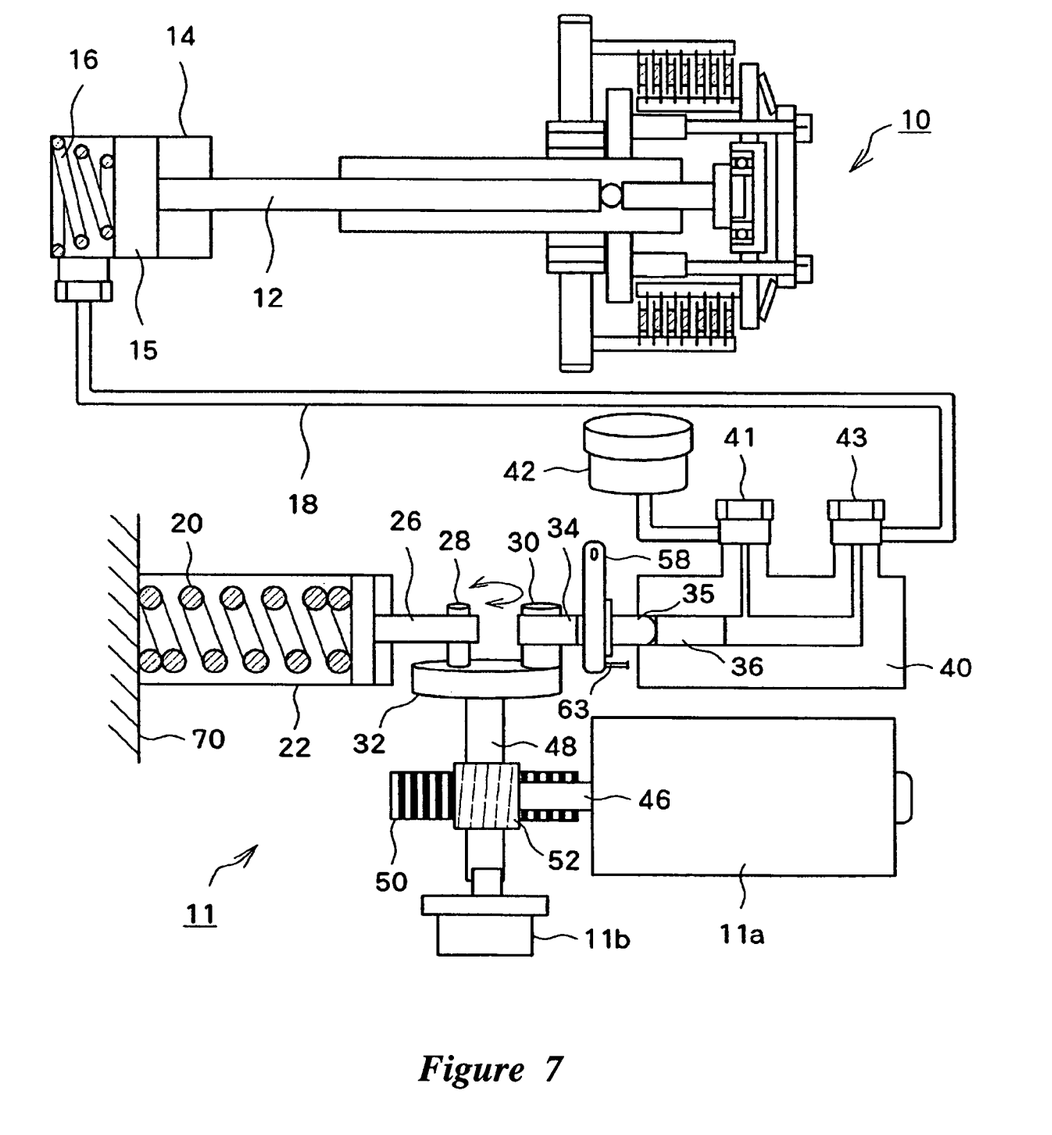
FIG. 7 is an illustration of a clutch control system that is arranged and configured in accordance with certain features, aspects and advantages of the present invention.

In one preferred configuration, the clutch actuator 11 comprises a direct current (dc) motor 11a (see FIG. 7). Other suitable types of motors or linear actuators also can be used. In the illustrated configuration, forward rotation of the dc motor 11a can disengage the clutch while reverse rotation of the dc motor can engage the clutch or put the clutch in a desired position between the disengaged state and the engaged state.

A clutch potentiometer 11b preferably is mounted to the clutch actuator 11. The clutch potentiometer 11b can comprise a resistor and other suitable electrical components such that voltage indicative of an operational state of the clutch actuator 11 (e.g., a voltage indicative of a clutch position) can be supplied to the control device 120. Any suitable configuration can be used that supplies information regarding the clutch position to the control device. In the preferred embodiment, the voltage value is used to supply information regarding the clutch position to the control device 120.

The shift actuator 13 also comprises a dc motor (not shown). Other suitable types of motors or linear actuators also can be used. In the illustrated configuration, normal rotation of the motor can cause up-shifting of the transmission and reverse rotation of the motor can cause down-shifting of the transmission.

Preferably, the shift actuator 13 is mounted to a shift arm of the transmission. The dc motor is rotated in a first direction to move the shift arm in one direction and the dc motor is rotated in a second direction to move the shift arm in the other direction. A shift potentiometer 13b preferably is mounted to the shift actuator 13. The shift potentiometer 13b can comprise a resistor and other suitable electrical components such that voltage indicative of an operational state of the shift actuator 13 (e.g., a voltage indicative of a shift actuator/shift lever position) can be supplied to the control device 120. Any suitable configuration can be used that supplies information regarding either or both of the shift actuator position and shift lever position. In the preferred embodiment, the voltage value is indicative of a turning angle of the shift arm. The voltage value can be supplied to the control device 120 and the voltage value can be used by the control device 120 as information relating to a turning angle of the shift actuator. In one configuration, the transmission is shiftable among neutral and multiple forward speeds. Preferably, the transmission is shiftable among neutral and five forward speeds. The transmission can feature a shift dog or any other suitable shifting configuration.

Figure 3:
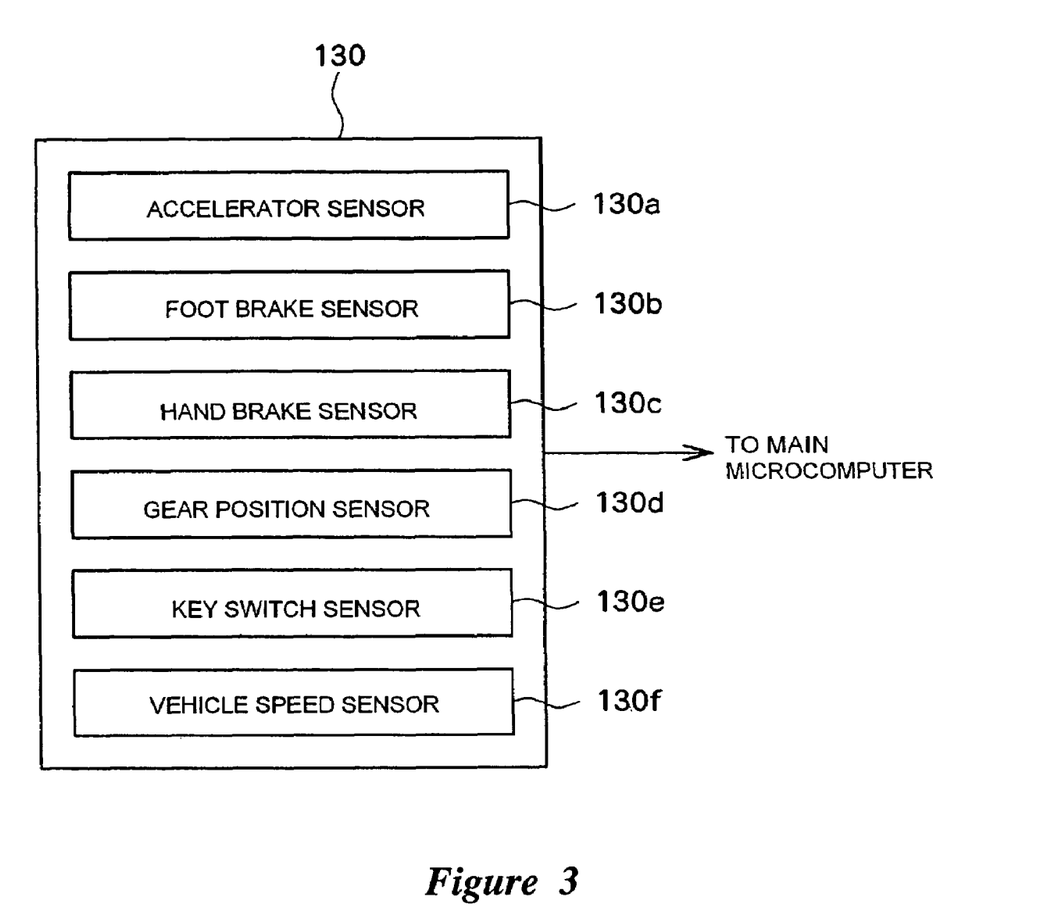
FIG. 3 is a schematic view showing a preferred construction of a sensor/switch group.

With reference now to FIG. 3, the sensor/switch group 130 preferably comprises an accelerator sensor 130a, a foot brake sensor 130b, a hand brake sensor 130c, a gear position sensor 130d, a key switch sensor 130e, and a vehicle speed sensor 130f. Other sensors also can be used. In addition, while the illustrated sensors preferably directly detect the states of the associated components, the sensors also can comprise so-called pseudo sensors that indirectly detect the states of the components desired to be sensed.

The accelerator sensor 130a preferably detects the accelerator opening degree and inputs a representative value into the control device 120. The foot brake sensor 130b preferably inputs into the control device 120 the tread angle of a rear wheel brake mounted to the rear wheel 112 or data indicative of whether the rear wheel brake is operated. The gear position sensor 130d preferably is mounted to the transmission and is used to input into the control device 120 data indicative of a present transmission position, such as a present gear ratio (e.g., degree of rotation of the shift drum). The key switch sensor 130e detects the state (e.g., ON, OFF or the like) of a key switch and inputs a representative value into the control device 120. The vehicle speed sensor 130f detects data indicative of vehicle speed (or information equivalent thereto) and inputs data or corresponding data into the control device 120. In one configuration, the vehicle speed sensor 130f may detect the number of rotations of the drive shaft of the transmission (e.g., a sensor associated with a counter shaft), or may detect movement of a chain which can be connected to the drive shaft without significant play, or may detect movement of a shaft drive, or a tire hub. The detected data can be used to compute the vehicle speed in any suitable manner. In some configurations, the vehicle speed may be obtained by detecting the rotating speed of a main shaft and a middle shaft (an idler shaft) of the transmission, and multiplying the value thereof by a reduction ratio of the present gear position (number) of the transmission.

With reference again to FIG. 2, the control device 120 chiefly comprises a main microcomputer 144 that controls operation of the clutch actuator 11 and that controls operation of the shift actuator 13. Preferably, the control device 120 controls the clutch actuator based upon various information indicating the state of the vehicle. The information can be input from the sensor/switch group 130, the clutch potentiometer 11b, and the shift potentiometer 13b. Other configurations also can be used. In general, the control device 120 comprises the main microcomputer 144, a power circuit 146, a motor drive circuit 138 that drives the clutch actuator 11, and a motor drive circuit 140 that drives the shift actuator 13.

The power circuit 146 preferably comprises a switch (not shown) that is switched to an ON position when the key switch is moved to the ON position. The power circuit 146 also preferably comprises a holding circuit 146a. When the switch is moved to the ON position, the power circuit 146 preferably applies the voltage of the battery 126 to the main microcomputer 144. When the key switch is moved to the OFF position, the power circuit switch preferably is held in the ON position by the holding circuit 146a. While the power circuit switch is held in the ON position, the power circuit 146 continues to apply the drive voltage to the main microcomputer 144 until the shutdown operations of the main microcomputer 144 have been completed. When the shutdown operations have been completed, the main microcomputer 144 instructs the holding circuit 146a to stop supplying electric power so that the supply of electric power to the main microcomputer 144 from the power circuit 146 ceases.

In one configuration, the motor drive circuit 138 comprises a known H bridge circuit. The motor drive circuit 138 feeds electric current from the battery 126 to the dc motor of the preferred clutch actuator 11. The current is delivered to rotate the dc motor in the direction and at the speed corresponding to the clutch actuator drive signal supplied from the main microcomputer 144. Similarly, in one configuration, the motor drive circuit 140 comprises a known H bridge circuit. The motor drive circuit 140 feeds electric current from the battery 126 to the dc motor of the preferred shift actuator 13. The current is delivered to rotate the dc motor in the direction and at the speed corresponding to the shift actuator drive signal supplied from the main microcomputer 144.

Figure 4:
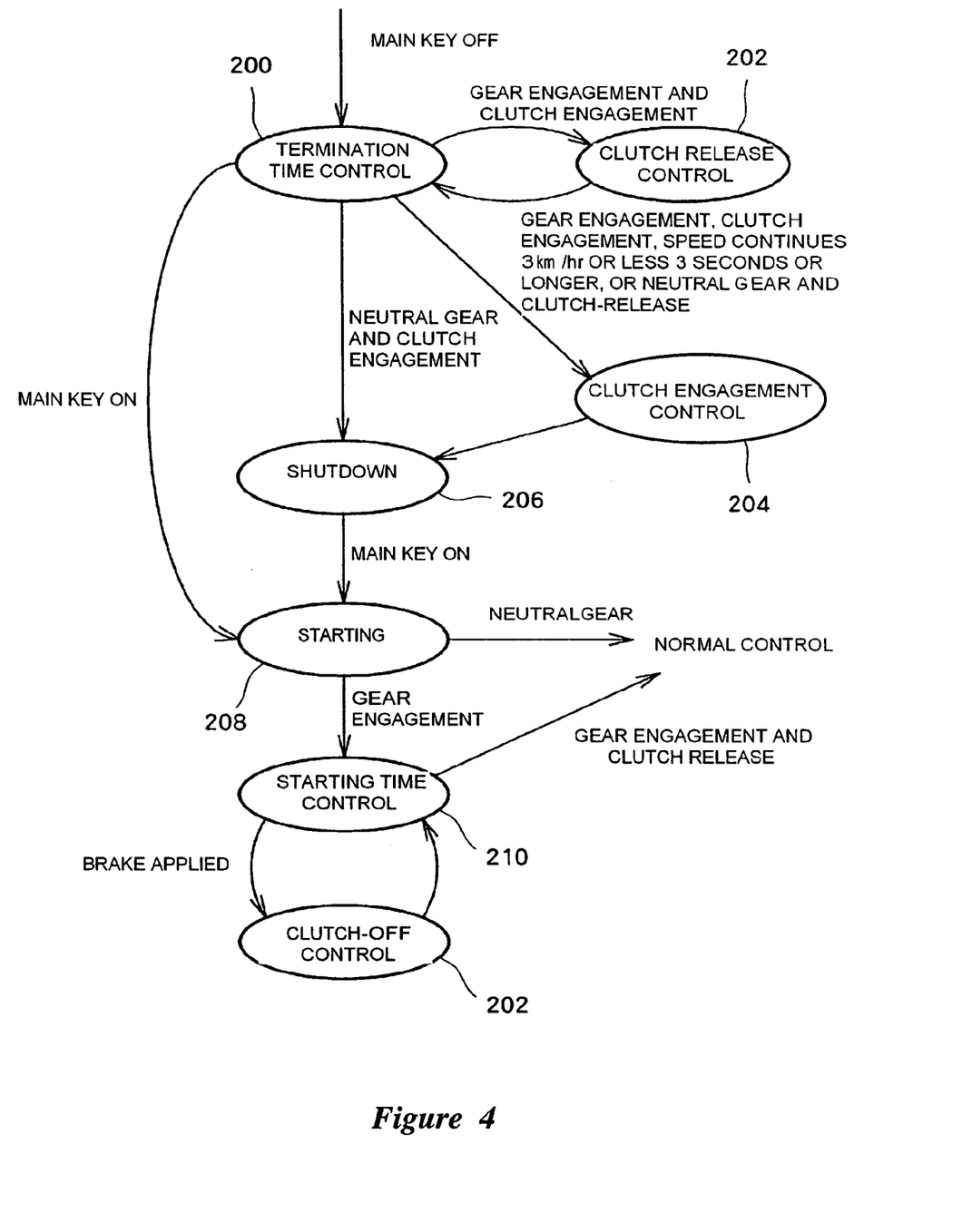
FIG. 4 is a flow diagram illustrating how the control state changes when a main key is operated.

With reference now to FIG. 4, control by the microcomputer 144 in the illustrated embodiment changes depending upon the position of the key switch (i.e., the main key). The main microcomputer 144 can execute a number of different routines or programs and does so depending upon various criteria. As shown in the figure, the main microcomputer 144 executes a termination time control program 200, a clutch release control program 202, a clutch engagement control program 204, a shutdown program 206, a starting program 208, and a starting time control program 210. Preferably, these programs are stored in a ROM, or any other suitable information storage medium. In one configuration, the memory location can be in the main microcomputer 144.

The termination time control program 200 preferably is executed when data is transmitted that is indicative of the key switch being positioned in the OFF position is input from the key switch sensor 130e. The terminate time control program 200 starts the clutch disengagement control program 202 if the gears of the transmission are in any torque-transferring position and if the clutch is engaged. After the clutch is disengaged by the clutch disengagement control program 202, control by the termination time control program 200 is resumed. In addition, the transmission is considered to be engaged if any of the torque-transferring gears are engaged and such information is conveyed when data input from the gear position sensor 130d indicates that the transmission of the motorcycle 100 is put in any one of the multiple gear combinations (e.g., the preferred transmission is in any of the 5 speed combinations available such that it is not in neutral). Also, clutch engagement corresponds to situations in which the clutch position data obtained by the clutch potentiometer 11b indicate that the clutch is engaged state (i.e., the clutch is ON).

With continued reference to FIG. 4, the termination time control program 200 executes the clutch engagement control program 204 if the transmission is in-gear, the clutch is disengaged, and the vehicle is stopped (e.g., the engine is turned off or stalled), or if the transmission is in neutral and the clutch is disengaged. The clutch engagement control program 204 engages the clutch.

After the clutch is engaged by the clutch engagement control program 204, the shutdown program 206 is executed. Advantageously, the shutdown program 206 initiates the shutdown operation of the main microcomputer 144 and feeds to the holding circuit 146a a signal to stop supply of electric power to the main microcomputer 144. Thus, the signal advantageously causes the stopping of the supply of electric power to the main microcomputer 144 from the power circuit 146. Preferably, clutch disengagement is confirmed if the clutch position data obtained by the clutch potentiometer 11b indicates that the clutch is disengaged state (the clutch is OFF). Vehicle stopping preferably is confirmed if the vehicle state data input from the vehicle speed sensor 130f indicates a predetermined speed (for example but without limitation, a speed per hour of 3 km) or less, for a predetermined time (for example but without limitation, 3 seconds). The predetermined speed can be one at which the vehicle can be estimated to be substantially stationary and/or one at which, even when the clutch is engaged, the motorcycle 100 generally does not move in any significant manner. A neutral gear position preferably is confirmed if the data indicating that the transmission of the motorcycle 100 is in a neutral state is input from the gear position sensor 130d.

The termination time control program 200 can start the shutdown program 206 if the transmission is in neutral and the clutch is engagement. If data indicative of the key switch being positioned in the ON position is input while the termination time control is on-going, the starting program 208 is executed. In other words, if the key switch is moved to an ON position while the termination time control is proceeding, the termination time control 200 is stopped and the starting time control 210 is begun.

The clutch release control program 202 is a control program that feeds a clutch actuator drive signal of a predetermined pattern to the motor drive circuit 138 to rotate the dc motor 11a in a first direction and disengage the clutch. On the other hand, the clutch engagement control program 204 is a control program that feeds a clutch actuator drive signal of a predetermined pattern to the motor drive circuit 138 to rotate the dc motor 11a in the other direction and engage the clutch.

The starting program 208 can be executed when the key of the motorcycle 100 is inserted into the key switch prior to being turned toward an ON side (main key on) while the stopping time or termination time control program 200 is being executed. More preferably, the starting program 208 is executed if, based on output of the key switch sensor 130e, the key is inserted into the key switch and has yet to be turned toward the ON position. In one configuration, movement from the insertion position and the ON position triggers execution of the starting program 208.

The starting program 208 initializes some of the settings of the control device 120 and determines whether the transmission of the motorcycle 100 is in a neutral position. If the transmission is in neutral, the starting program shifts to normal control (e.g., stopping state control, traveling state control, up-shift control, down-shift control, clutch release and up-shift control, clutch release and down-shift control, etc.).

If upon starting the transmission is in any other position other than neutral (i.e., in a torque-transferring mode), the starting program 208 initiates the starting time control program 210. The starting time control program 210 monitors whether the brake is actuated and starts the clutch release control program 202 when the brake is actuated (i.e., the brake is engaged such that it is detected as being in an ON position). Thus, when the brake is not actuated (e.g., disengaged), control by the starting time control program 210 is resumed and, if the transmission is in a gear engagement position and the clutch is disengaged, the starting program shifts to normal control. Whether the brake is engaged is determined based upon input from the foot brake sensor 130*b* and the hand brake sensor 130*c*. Specifically, in one preferred configuration, where data indicating that the rear wheel brake is applied is input from the foot brake sensor 130*b* or data indicating that the front wheel brake is applied is input from the hand brake sensor 130*c*, it is determined that the brake is applied. Thus, it preferably is judged that the brake of the motorcycle 100 is engaged provided that either the front wheel brake or the rear wheel brake is applied. In some configurations, however, it may be judged that the brake of the motorcycle 100 is not applied unless both brakes are applied.

Figure 5:
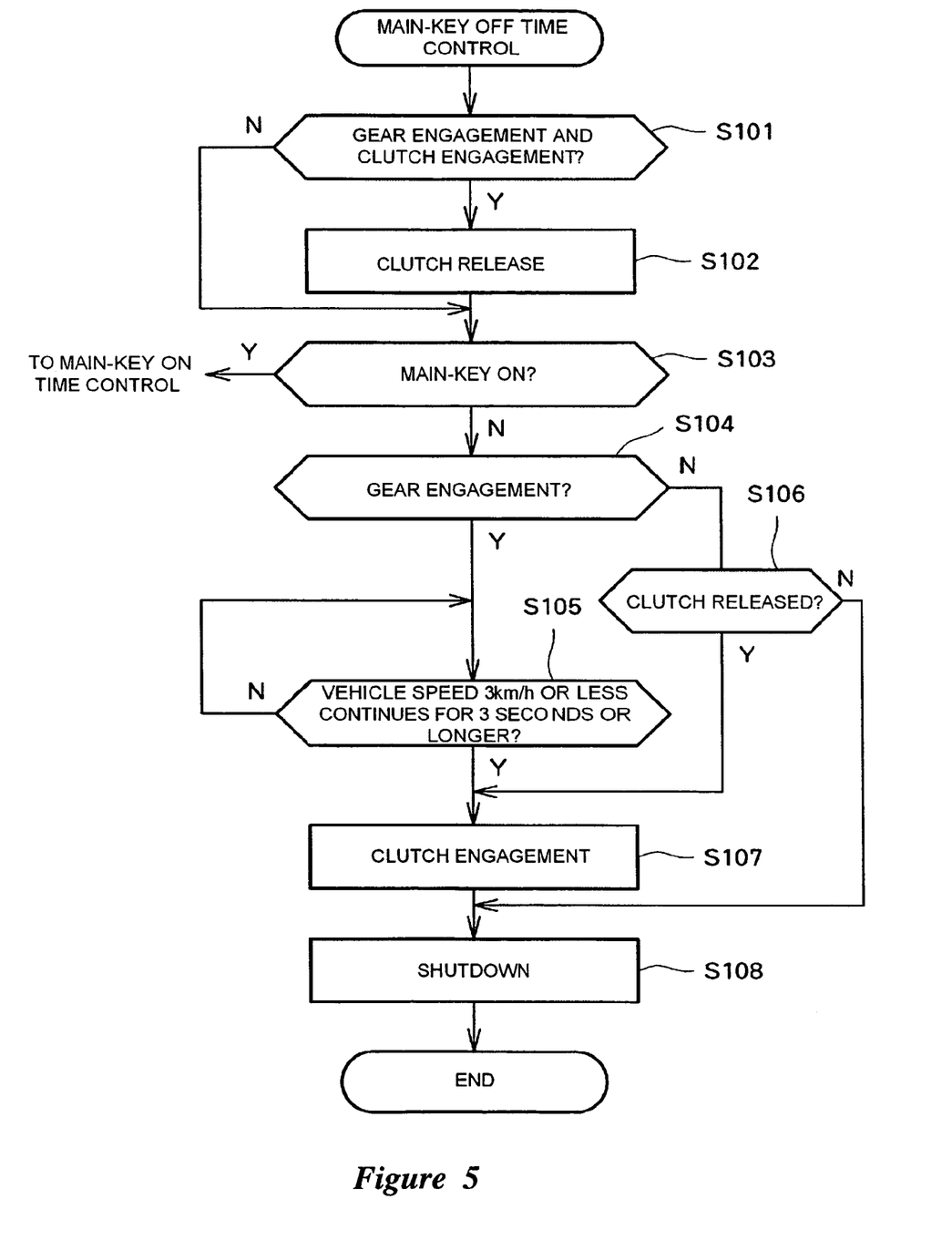
FIG. 5 is a flowchart illustrating a main-key off control routine.

With reference now to FIG. 5, the main-key off control will be described in greater detail. As illustrated in FIG. 5, whether the vehicle is in a state of gear engagement and clutch engagement is checked first at the time of main-key off by the termination time control program 200 (S101). If the gear is engaged and the clutch is engaged, the clutch release control program 202 disengages the clutch (S102). On the other hand, if either the gears are disengaged (e.g., the transmission is in neutral) or the clutch is disengaged, S102 can be skipped. Subsequently, the termination time control program 200 judges whether the key switch has been turned ON (S103). If the key switch is turned ON, the control shifts to the main key-on-time control (see FIG. 6). On the other hand, when the key switch remains in the OFF position, it is judged whether the transmission gears of the motorcycle 100 are engaged (S104). If the gears are engaged, the control stands by until the vehicle slows to a speed equal to or less than the predetermined speed (for example, 3 km/h) for at least a predetermined period of time (for example, 3 seconds) (S105). When this occurs, the clutch is engaged by the clutch engagement control program 204 (S107). When it is judged in S104 that the transmission gears of the motorcycle 100 are not engaged (e.g., the transmission is in neutral), it is then judged whether the clutch is disengaged (S106). If the clutch is disengaged, the clutch is engaged by the clutch engagement control program 204 (S107). When the clutch is engaged in S107, the shutdown program 206 subsequently begins shutdown operations (S108) and then the main-key off time control is terminated. If it is judged in S106 that the clutch is engaged, the shutdown operations is begun by the shutdown program 206 with the clutch as it is (S108) and then the main-key off time control is terminated.

According to the main-key off time control, it is possible to stop the motorcycle 100 and the clutch will be surely engaged such that it is possible to reduce the likelihood of the vehicle moving even if the motorcycle 100 is stopped on a slope.

Figure 6:
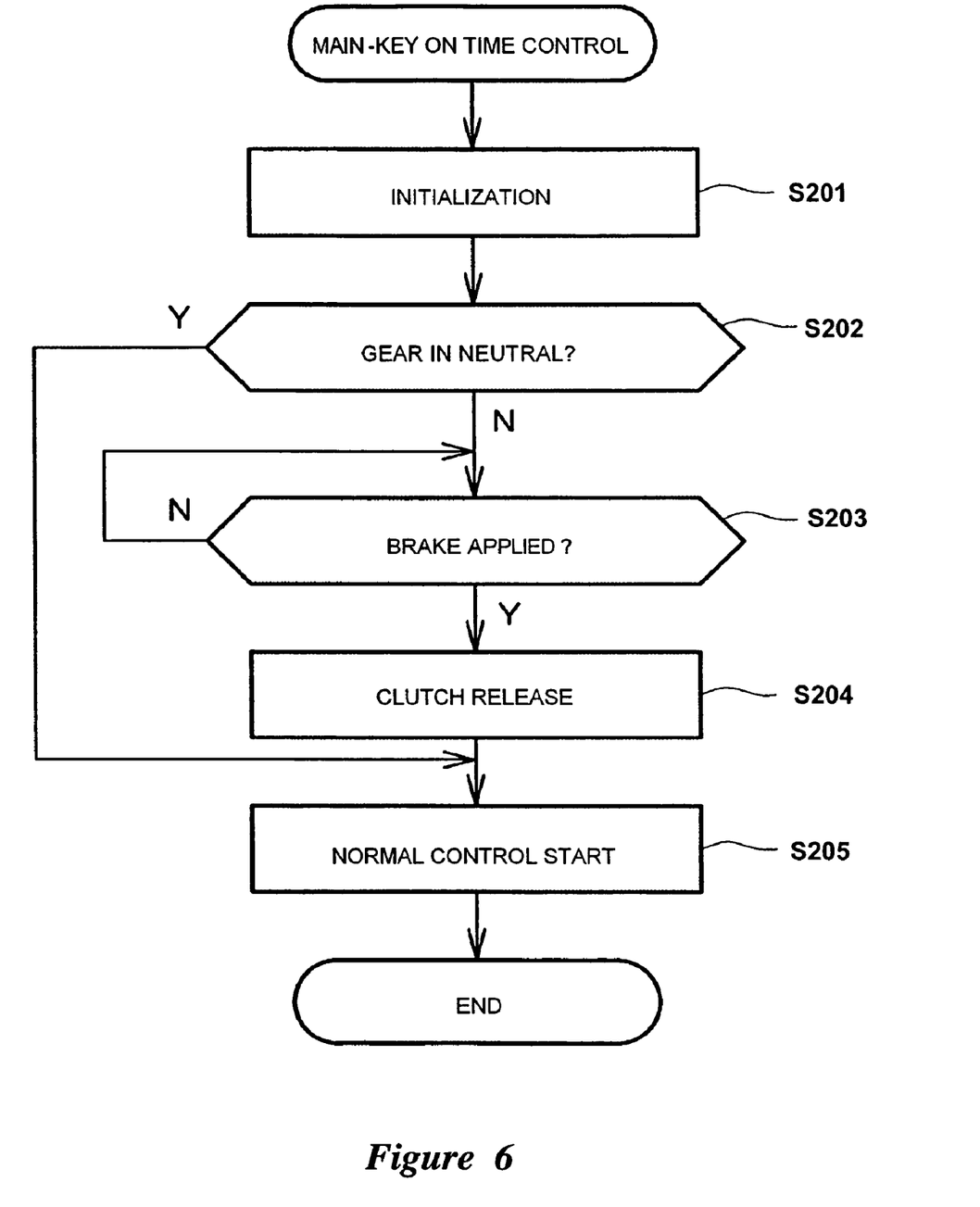
FIG. 6 is a flowchart illustrating a main-key on control routine.

With reference now to FIG. 6, a main-key on time control used in one embodiment of the vehicle 100 will be discussed. The processing illustrated in the figure begins when key switch is positioned in the ON position and the starting program 208 performs various initializing operations (S201). Subsequently, it is judged whether the transmission is in a neutral state (S202). If the transmission is in neutral, the routine shifts to a normal control without manipulating the transmission or the clutch (S205). On the other hand, if the transmission is not in neutral (e.g., one of the gears is engaged), the starting time control program 210 stands by until the brake is engaged (S203). When the brake is engaged, the clutch release control program 202 disengages the clutch (S204). Thereafter, the control shifts to normal control (S205).

Thus, if the transmission is in gear, normal control does not begin until the brakes are actuated by the rider, which causes the clutch release control program 202 to disengage the clutch. The action of the clutch when the main-key is in the ON position can be varied depending on whether the transmission is in a torque-transmitting position or the transmission is in a neutral position at the time of main-key off. If the main key is turned OFF when the transmission is in-gear, parking on a slope can be properly accommodated and, when the main key is turned ON, the clutch will be disengaged as soon as the brakes are applied. Thus, by having the clutch engaged or the brakes engaged, the transmission reduces the likelihood of vehicle movement until the brakes are applied so that it is possible to greatly reduce the likelihood of the vehicle moving inadvertently when the vehicle is intended to be stopped.

With reference now to FIG. 7, the clutch actuator 11 will be described in greater detail. In one preferred configuration, the clutch is a wet type multiple-disc clutch 10. The clutch 10 preferably is positioned within a crankcase of the engine 106. The illustrated clutch 10 can be engaged or disengaged by manipulation of a push rod 12. The illustrated clutch 10 also comprises a clutch spring whose biasing force pushes a clutch disc, which is connected either directly or indirectly to a crankshaft (on a drive side) of the engine, against a friction disc, which is connected either directly or indirectly to a transmission main shaft (on a driven side). Therefore, the clutch 10 can be engaged as desired. The clutch 10 can be semi-engaged by pushing the push rod 12 toward the clutch 10 against the push force of the clutch spring and can be disengaged by further pushing the push rod. The clutch can have any suitable configuration and, therefore, the details of the clutch itself are not important.

With the clutch control system, the push rod 12 of the clutch 10 is manipulated by a hydraulic mechanism and the spring of the clutch. In other words, the hydraulic mechanism pushes the push rod 12 and the push rod 12 is returned by the spring of the clutch. The hydraulic mechanism preferably comprises a fluid hose 18 through which fluid passes. Hydraulic fluid, oil or any other suitable fluid can be used. A clutch disengagement cylinder 14 can be connected to one end of the hose 18 and a master cylinder 40 can be connected to the other end of the hose 18 through a suitable connector 43. A piston 15 is mounted in the clutch disengagement cylinder 14. The piston 15 is pushed by fluid flowing from the hose 18 into the clutch disengagement cylinder 14. A clutch disengagement spring 16 preferably biases the piston 15 toward the clutch 10 such that the travel of the piston 15 away from the clutch 10 can be somewhat limited. When the fluid flows in from the hose 18, the piston 15 is moved toward the clutch 10 which pushes the push rod 12 toward the clutch 10. As a result, the clutch 10 is either semi-engaged or disengaged. Conversely, when the flow of fluid from the master cylinder 40 ceases, the push rod 12 can be returned toward the piston and the piston can be returned toward the spring 16 by the clutch spring. As such, the clutch 10 is engaged.

A reservoir tank 42 preferably is connected to the master cylinder 40 through a connector 41. The reservoir tank 42 can correct a hydraulic pressure in the system.

In the illustrated configuration, the clutch actuator 11 comprises the master cylinder 40 and a mechanism that exerts and releases pushing pressure on a piston 36 of the master cylinder 40. Preferably, the piston 36 of the master cylinder 40 is moved by a first piston push rod 35 (e.g., a clutch operating member, a first piston pushing pressure mechanism). A manipulation arm 58 and a second piston push rod 34 preferably are provided in a manner such that they abut independently against the first piston push rod 35.

The manipulation arm 58 can be connected to the clutch lever 104 through a length of wire or cable 63 such that, when a rider manipulates the clutch lever 104, the manipulation arm 58 is moved by the wire 63. Accordingly, the manipulation arm 58 moves the first piston push rod 35 and the piston 36 is pushed toward the interior of the master cylinder 40. Also, when the rider returns the clutch lever 104 to its original position, the manipulation arm 58 is returned to its initial position whereby the piston 36 is also returned to its original position.

Preferably, the second piston push rod 34 is driven by the dc motor 11a, which is included in the clutch actuator 11, to move the first piston push rod 35 independently of the manipulation arm 58 such that the piston 36 is pushed toward the interior of the master cylinder 40. When the dc motor 11a rotates in the second direction, the second piston push rod 34 returns to its initial position (a clutch connection position) and the clutch 10 correspondingly returns to an engaged state.

As described above, a force that moves the clutch 10 toward engagement is applied to the push rod 12 by the clutch spring provided in the clutch 10. It is noted that varied types of springs can be used in clutches for this purpose. In order to cause the second piston push rod 34 to push the piston 36, the illustrated dc motor 11a rotates a rotating member 32 against this restoring force. Thus, in the illustrated clutch actuator 11, an auxiliary spring 22 is mounted to the rotating member 32 to lower the required output power for the dc motor 11a.

The rotating member 32 preferably comprises a rotating shaft 28 to which the auxiliary spring 22 can be connected. The rotating member 32 also comprises a rotating shaft 30 to which the second piston push rod 34 can be connected. In one configuration, the rotating shaft 28 extends in a parallel direction relative to a rotating shaft 48 on the other side of the rotating member 32.

The auxiliary spring assembly 22 comprises a first auxiliary spring shaft 26. In one configuration, the first auxiliary spring shaft 26 is rotatably connected to the rotating shaft 28. In such a configuration, the other end of the auxiliary spring assembly 22 can abut against an inner wall of an actuator casing 70. Preferably, the actuator casing 70 contains elements of the clutch actuator 11. The auxiliary spring 22 can comprise a coil spring 20, which is compressed to a length that is shorter than its natural length. Thus, the coil spring 20 exerts an expansion pressure. In the illustrated configuration, one end of the auxiliary spring assembly 22 is supported by the inner wall of the actuator casing 70, which is fixed on a vehicle side, and the other end of the auxiliary spring assembly 22 pushes the first auxiliary spring shaft 26 toward the rotating member 32. Accordingly, an elastic force of the coil spring 20 causes the first auxiliary spring shaft 26 to push the rotating shaft 28 in a direction of expansion, which imparts an auxiliary torque to the rotating shaft 28.

With continued reference to FIG. 7, the clutch potentiometer 11b is mounted on a worm wheel 50. The clutch potentiometer 11b comprises a resistor and other suitable electrical components such that a voltage value corresponding to an angle of rotation of the rotating member 32 can be output. The voltage value can be input into the control device 120 and, therefore, can be used to control of movement of the dc motor 11a or the like. The control device 120 preferably determines the rotation angle of the rotating member 32 from the output of the clutch potentiometer 11b and so is able to set the rotating member 32 to a desired rotation angle between an angle (angle of engagement) at which there is clutch engagement and an angle (angle of disengagement) at which there is disengagement of the clutch 10. In some configurations, the rotation of a rotating shaft 46 of the motor 10 may be detected for use in control.

Figure 8:
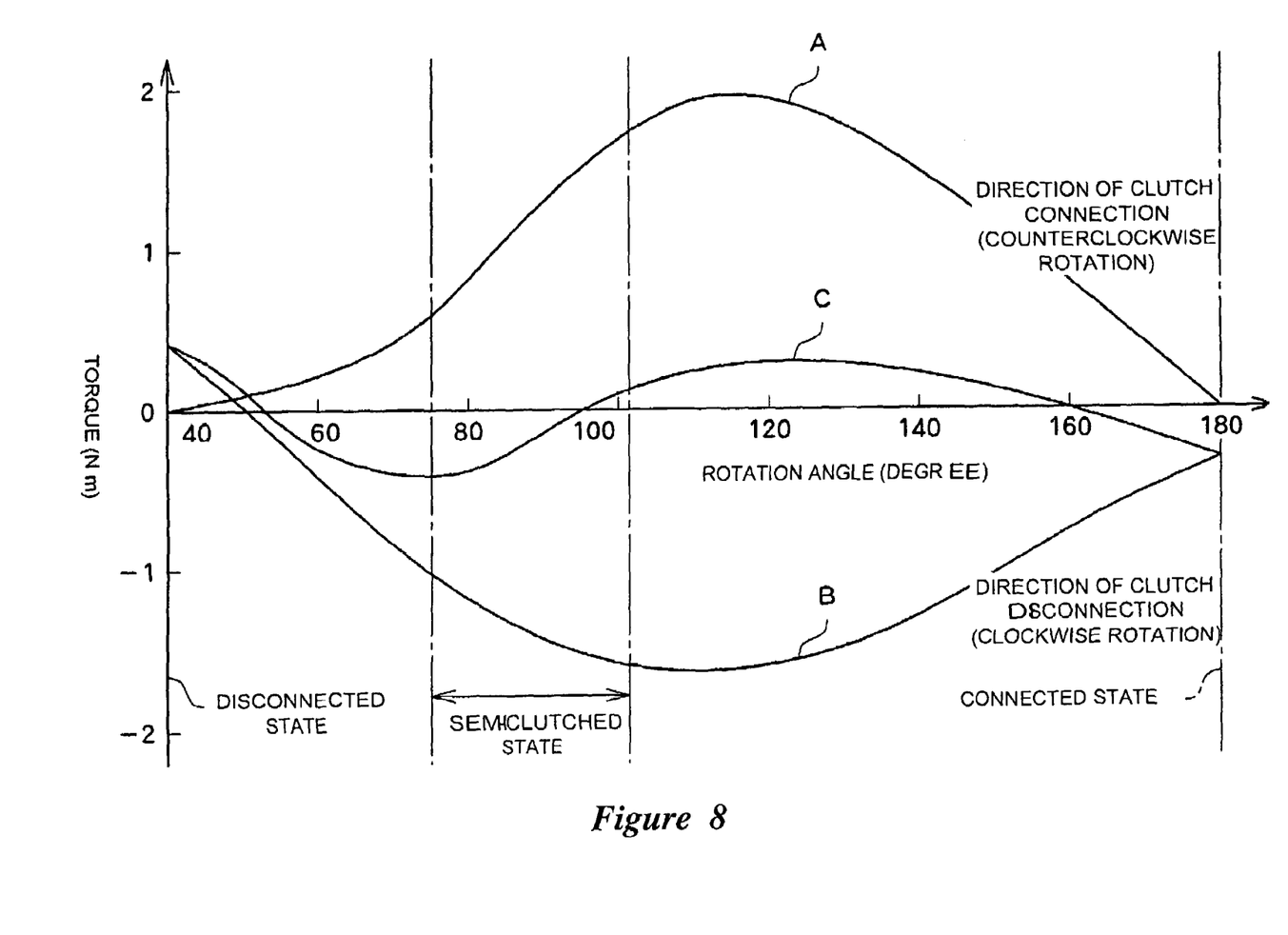
FIG. 8 is a graph illustrating the relationship among torque imparted to a rotating member from a clutch side, torque imparted to the rotating member by an auxiliary spring, and a composite torque thereof.

FIG. 8 is a graph illustrating the relationship among the torque (curve A) imparted to the rotating member 32 by the second piston push rod 34 (under the force of the clutch spring), the torque (curve B) imparted to the rotating member 32 by the auxiliary spring 22, and a composite torque thereof (curve C). The Y-axis on the graph indicates a torque value. A negative value indicates a torque acting to rotate the rotating member 32 clockwise in FIG. 7 to push the second piston push rod 34 toward the master cylinder 40, thereby disengaging the clutch 10. A positive value indicates a torque acting to rotate the rotating member 32 counterclockwise in FIG. 7 to return the second piston push rod 34 towards its original position, thereby engaging the clutch 10. The X-axis in the graph indicates a rotational angle of the rotating member 32. In the illustrated embodiment, the clutch is engaged when the rotational angle is about 40 degrees, and the clutch is disengaged when the rotational angle is about 180 degrees.

With reference to curve A in the figure, the torque imparted to the rotating member 32 by the second piston push rod 34 at about 40 degrees (corresponding to a clutch engaged position) is zero (or thereabout) as a result of the clutch spring relaxing to a substantially unloaded state. When the rotating member 32 is rotated in a direction of clutch disengagement (clockwise), the torque represented by curve A gradually increases to resist the clockwise rotation of the rotating member 32. That is, rotation of the rotating member 32 causes the piston 36 to move leftward in FIG. 7, thereby loading the clutch spring. The clutch spring force produces a positive torque on the rotating member 32 (e.g., a torque in the counterclockwise direction). Thereafter, as the rotating member 32 continues to rotate, a distance (or moment arm) between a rotational axis of the rotating member 32 and a vector of the clutch spring force first increases and then begins to decrease. The vector of the clutch spring force extends along the longitudinal axis of the second piston push rod 34. As a result of this decreasing moment arm, the torque on the rotating member 32 produced by the clutch spring begins to decrease as the rotating member 34 continues to rotate clockwise. In a disengaged state of the clutch 10, the vector of the clutch spring force extends through the rotational axis of the rotating member 32 so as to produce about zero torque on the rotating member 32. That is, while the clutch spring is fully loaded, its produces no or substantially no torque on the rotating member 32 because the clutch spring force vector intersects with the rotational axis of the rotating member. There is no moment arm (or a very small one) at the state of clutch disengagement.

Curve B shows the torque acting on the rotating member 32 that is caused by the auxiliary spring 22. This torque will herein be referred to as an "assist torque." At the state of clutch engagement (e.g., the about 40 degree position of the rotating member), the auxiliary spring is loaded and produces an auxiliary spring force vector that extends to the left side of the rotational axis of the rotating member 32 in FIG. 7. As such, the auxiliary spring 22 produces a positive assist torque, thereby promoting clutch engagement (e.g., biasing counterclockwise rotation of the rotating member 32). When the rotating member 32 is rotated in a direction of clutch disengagement (e.g., clockwise), the positive assist torque decreases to about zero as the moment arm between the auxiliary spring force and the rotational axis shrinks to about zero. Further rotation of the rotating member 32 produces a moment arm between the auxiliary spring force and the rotational axis on the other side of the rotational axis (e.g., on the right side in FIG. 4). Consequently, the auxiliary spring 22 generates a negative assist torque on the rotating member 32, thereby assisting to disengage the clutch 10. The negative assist torque continues to increase with rotation of the rotating member 32 despite the additional clockwise rotational movement unloading the auxiliary spring 22. The increase in the negative assist torque continues through a range of rotation that corresponds to a semi-engaged state as the moment arm continues to increase. Further rotation of the rotating member 32 in the clockwise direction beyond the semi-engaged state causes the negative assist torque to decrease as a consequence of further unloading of the auxiliary spring 22 and/or a decrease of the corresponding moment arm. Once the rotating member 32 has rotated to a position corresponding to the disengaged state (e.g., 180 degrees in the illustrated embodiment), the auxiliary spring 22 remains loaded, but only slightly. The moment arm also has decreased so as to produce only a small amount of negative assist torque on the rotating member 32.

As represented by curve C in the FIG. 8, the torque imparted by the second piston push rod 34 and the torque imparted by the auxiliary spring 22 act in opposite directions to offset each other over a substantial portion of the rotating member's motion. Therefore, an absolute value of torque imparted to the rotating member 32 becomes a relatively small value, so that the motor 44 can readily drive the rotating member 32. Also, at the rotational angle of engagement (i.e., a clutched state), the composite torque acts in a direction of clutch engagement (e.g., counterclockwise in the illustrated embodiment). Therefore, the members (e.g., plates) of the clutch 10 remain biased towards one another during the engaged state (i.e., clutched state) to stabilize this operational state of the clutch 10. Also, at the rotational angle of disengagement (i.e., unclutched state), the composite torque acts in a direction of clutch disengagement (e.g., clockwise in the illustrated embodiment). Therefore, the members (e.g., plates) of the clutch 10 remain biased apart from one another during the disengaged state (i.e., unclutched state) to stabilize this operational state of the clutch 10. Further, at rotational angles corresponding to the semi-engaged state of the clutch 10, torque in a direction of clutch engagement is generated as the rotating member 32 rotates in a direction of clutch disengagement, and torque in a direction of clutch disengagement is generated as the rotating member 32 rotates in a direction of clutch engagement. As a consequence of the composite torque counteracting rotational movement of the rotating member 32 through the rotational range corresponding to the semi-engaged state, the clutch 10 has increased stability in the semi-engaged state as compared to prior clutch actuator mechanisms.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A clutch control device of a straddle vehicle that is used to engage and disengage a clutch with a clutch actuator, the clutch control device comprising:
    an operation detection means that detects a predetermined operation indicative of the vehicle being started, the predetermined operation indicative of the vehicle being started comprising placing a key switch of the vehicle in an ON position,
    brake application detection means that detects application of a brake of the vehicle,
    clutch control means disengaging the clutch upon detection of brake application if the predetermined operation indicative of the vehicle being started is detected, and normal control beginning once the clutch has been disengaged,
    wherein the clutch actuator comprises a rotating member, a mechanized actuator connected to the rotating member, a clutch operating assembly comprising a first end and a second end, the first end of the clutch operating assembly being acted upon by a clutch spring provided on the clutch and the second end of the clutch operating assembly being connected to the rotating member, and the clutch operating assembly acting to disengage the clutch by opposing the clutch spring.

2. The device of claim 1, wherein the clutch actuator further comprises an elastic expansion assembly comprising a first end and a second end, the first end of the elastic expansion assembly being supported on the vehicle, the second end of the elastic expansion assembly being connected to the rotating member, the elastic expansion member comprising an elastic member, and rotation of the rotating member in a first direction causing the clutch operating member to move in a clutch engagement direction and the elastic expansion member and the mechanized actuator biasing the rotating member so as to cause the rotating member to rotate in the first direction.

3. The device of claim 2 in combination with a straddle vehicle.

4. A clutch control device of a straddle vehicle that is used to engage and disengage a clutch with a clutch actuator, the clutch control device comprising:
    an operation detection means that detects a predetermined operation indicative of the vehicle being started, the predetermined operation indicative of the vehicle being started comprising placing a key switch of the vehicle in an ON position,
    brake application detection means that detects application of a brake of the vehicle,
    gear engagement judgment means that evaluates whether a transmission of the vehicle is in a torque-transmitting mode,
    clutch control means disengaging the clutch upon detection of brake application if the predetermined operation indicative of the vehicle being started is detected and the transmission is in the torque-transmitting mode, and normal control beginning once the clutch has been disengaged,
    wherein the clutch actuator comprises a rotating member, a mechanized actuator connected to the rotating member, a clutch operating assembly comprising a first end and a second end, the first end of the clutch operating assembly being acted upon by a clutch spring provided on the clutch and the second end of the clutch operating assembly being connected to the rotating member, and the clutch operating assembly acting to disengage the clutch by opposing the clutch spring.

5. The device of claim 4, wherein the clutch actuator further comprises an elastic expansion assembly comprising a first end and a second end, the first end of the elastic expansion assembly being supported on the vehicle, the second end of the elastic expansion assembly being connected to the rotating member, the elastic expansion member comprising an elastic member, and rotation of the rotating member in a first direction causing the clutch operating member to move in a clutch engagement direction and the elastic expansion member and the mechanized actuator biasing the rotating member so as to cause the rotating member to rotate in the first direction.

6. The device of claim 5 in combination with a straddle vehicle.

7. A clutch control device of a straddle vehicle that is used to engage and disengage a clutch with a clutch actuator, the clutch control device comprising:
an operation detection means that detects a predetermined operation indicative of the vehicle being started,
brake application detection means that detects application of a brake of the vehicle,
gear engagement judgment means that evaluates whether a transmission of the vehicle is in a torque-transmitting mode,
clutch control means disengaging the clutch upon detection of brake application if the predetermined operation indicative of the vehicle being started is detected and the transmission is in the torque-transmitting mode,
normal control beginning once the clutch has been disengaged, and
wherein the clutch actuator comprises a rotating member, a mechanized actuator connected to the rotating member, a clutch operating assembly comprising a first end and a second end, the first end of the clutch operating assembly being acted upon by a clutch spring provided on the clutch and the second end of the clutch operating assembly being connected to the rotating member, and the clutch operating assembly acting to disengage the clutch by opposing the clutch spring.

8. The device of claim 7, wherein the clutch actuator further comprises an elastic expansion assembly comprising a first end and a second end, the first end of the elastic expansion assembly being supported on the vehicle, the second end of the elastic expansion assembly being connected to the rotating member, the elastic expansion member comprising an elastic member, and rotation of the rotating member in a first direction causing the clutch operating member to move in a clutch engagement direction and the elastic expansion member and the mechanized actuator biasing the rotating member so as to cause the rotating member to rotate in the first direction.

9. The device of claim 8 in combination with a straddle vehicle.

10. A clutch control device of a straddle vehicle that is used to engage and disengage a clutch with a clutch actuator, the clutch control device comprising:
an operation detection means that detects a predetermined operation indicative of the vehicle being started,
brake application detection means that detects application of a brake of the vehicle,
clutch control means disengaging the clutch upon detection of brake application if the predetermined operation indicative of the vehicle being started is detected, and normal control beginning once the clutch has been disengaged,
wherein the clutch actuator comprises a rotating member, a mechanized actuator connected to the rotating member, a clutch operating assembly comprising a first end and a second end, the first end of the clutch operating assembly being acted upon by a clutch spring provided on the clutch and the second end of the clutch operating assembly being connected to the rotating member, and the clutch operating assembly acting to disengage the clutch by opposing the clutch spring.

11. The device of claim 10, wherein the clutch actuator further comprises an elastic expansion assembly comprising a first end and a second end, the first end of the elastic expansion assembly being supported on the vehicle, the second end of the elastic expansion assembly being connected to the rotating member, the elastic expansion member comprising an elastic member, and rotation of the rotating member in a first direction causing the clutch operating member to move in a clutch engagement direction and the elastic expansion member and the mechanized actuator biasing the rotating member so as to cause the rotating member to rotate in the first direction.

12. The device of claim 11 in combination with a straddle vehicle.

13. A clutch control device of a straddle vehicle that is used to engage and disengage a clutch with a clutch actuator,
the clutch actuator comprises a rotating member, a mechanized actuator connected to the rotating member, a clutch operating assembly comprising a first end and a second end, the first end of the clutch operating assembly being acted upon by a clutch spring provided on the clutch and the second end of the clutch operating assembly being connected to the rotating member, and the clutch operating assembly acting to disengage the clutch by opposing the clutch spring,
the clutch control device comprising an operation detection means that detects a predetermined operation indicative of the vehicle being started, brake application detection means that detects application of a brake of the vehicle, and clutch control means that disengages the clutch upon detection of brake application if the predetermined operation indicative of the vehicle being started is detected, the predetermined operation indicative of the vehicle being started comprising placing a key switch of the vehicle in an ON position.

14. The device of claim 13, wherein the clutch actuator further comprises an elastic expansion assembly comprising a first end and a second end, the first end of the elastic expansion assembly being supported on the vehicle, the second end of the elastic expansion assembly being connected to the rotating member, the elastic expansion member comprising an elastic member, and rotation of the rotating member in a first direction causing the clutch operating member to move in a clutch engagement direction and the elastic expansion member and the mechanized actuator biasing the rotating member so as to cause the rotating member to rotate in the first direction.

15. The device of claim 14 in combination with a straddle vehicle.

16. A clutch control device of a straddle vehicle that is used to engage and disengage a clutch with a clutch actuator,
the clutch actuator comprising a rotating member, a mechanized actuator connected to the rotating member, a clutch operating assembly comprising a first end and a second end, the first end of the clutch operating assembly being acted upon by a clutch spring provided on the clutch and the second end of the clutch operating assembly being connected to the rotating member, and the clutch operating assembly acting to disengage the clutch by opposing the clutch spring, the clutch control device comprising an operation detection means that detects a predetermined operation indicative of the vehicle being started, the predetermined operation indicative of the vehicle being started comprising placing a key switch of the vehicle in an ON position, brake application detection means that detects application of a brake of the vehicle, clutch control means that disengages the clutch upon detection of brake application if the predetermined operation indicative of the vehicle being started is detected, and gear engagement judgment means that evaluates whether a transmission of the vehicle is in a torque-transmitting mode, the clutch control means disengaging the clutch upon detection of brake application if the predetermined operation indicative of the vehicle being started is detected and the transmission is in the torque-transmitting mode.

17. The device of claim 16, wherein the clutch actuator further comprises an elastic expansion assembly comprising a first end and a second end, the first end of the elastic expansion assembly being supported on the vehicle, the second end of the elastic expansion assembly being connected to the rotating member, the elastic expansion member comprising an elastic member, and rotation of the rotating member in a first direction causing the clutch operating member to move in a clutch engagement direction and the elastic expansion member and the mechanized actuator biasing the rotating member so as to cause the rotating member to rotate in the first direction.

18. The device of claim 17 in combination with a straddle vehicle.

19. A clutch control device of a straddle vehicle that is used to engage and disengage a clutch with a clutch actuator, the clutch actuator comprising a rotating member, a mechanized actuator connected to the rotating member, a clutch operating assembly comprising a first end and a second end, the first end of the clutch operating assembly being acted upon by a clutch spring provided on the clutch and the second end of the clutch operating assembly being connected to the rotating member, and the clutch operating assembly acting to disengage the clutch by opposing the clutch spring the clutch control device comprising an operation detection means that detects a predetermined operation indicative of the vehicle being started, brake application detection means that detects application of a brake of the vehicle, clutch control means that disengages the clutch upon detection of brake application if the predetermined operation indicative of the vehicle being started is detected, and gear engagement judgment means that evaluates whether a transmission of the vehicle is in a torque-transmitting mode, the clutch control means disengaging the clutch upon detection of brake application if the predetermined operation indicative of the vehicle being started is detected and the transmission is in the torque-transmitting mode.

20. The device of claim 19, wherein the clutch actuator further comprises an elastic expansion assembly comprising a first end and a second end, the first end of the elastic expansion assembly being supported on the vehicle, the second end of the elastic expansion assembly being connected to the rotating member, the elastic expansion member comprising an elastic member, and rotation of the rotating member in a first direction causing the clutch operating member to move in a clutch engagement direction and the elastic expansion member and the mechanized actuator biasing the rotating member so as to cause the rotating member to rotate in the first direction.

21. The device of claim 20 in combination with a straddle vehicle.

22. A clutch control device of a straddle vehicle that is used to engage and disengage a clutch with a clutch actuator, the clutch actuator comprising a rotating member, a mechanized actuator connected to the rotating member, a clutch operating assembly comprising a first end and a second end, the first end of the clutch operating assembly being acted upon by a clutch spring provided on the clutch and the second end of the clutch operating assembly being connected to the rotating member, and the clutch operating assembly acting to disengage the clutch by opposing the clutch spring, the clutch control device comprising an operation detection means that detects a predetermined operation indicative of the vehicle being started, brake application detection means that detects application of a brake of the vehicle, and clutch control means that disengages the clutch upon detection of brake application if the predetermined operation indicative of the vehicle being started is detected.

23. The device of claim 22, wherein the clutch actuator further comprises an elastic expansion assembly comprising a first end and a second end, the first end of the elastic expansion assembly being supported on the vehicle, the second end of the elastic expansion assembly being connected to the rotating member, the elastic expansion member comprising an elastic member, and rotation of the rotating member in a first direction causing the clutch operating member to move in a clutch engagement direction and the elastic expansion member and the mechanized actuator biasing the rotating member so as to cause the rotating member to rotate in the first direction.

24. The device of claim 23 in combination with a straddle vehicle.

* * * * *